United States Patent [19]
Pierce

[11] Patent Number: 5,924,712
[45] Date of Patent: Jul. 20, 1999

[54] DUAL TRAILING ARM VEHICLE SUSPENSION

[75] Inventor: William C. Pierce, Muskegon, Mich.

[73] Assignee: Neway Anchorlok International, Inc., Muskegon, Mich.

[21] Appl. No.: 08/865,428

[22] Filed: May 29, 1997

Related U.S. Application Data

[60] Provisional application No. 60/018,658, May 30, 1996.

[51] Int. Cl.⁶ ..................................................... B60G 9/02
[52] U.S. Cl. .............. 280/124.13; 280/683; 280/124.128
[58] Field of Search ............................ 280/683, 124.128, 280/124.13, 124.116

[56] References Cited

U.S. PATENT DOCUMENTS

| | | |
|---|---|---|
| 2,901,240 | 8/1959 | Fikse . |
| 2,941,817 | 6/1960 | Benson . |
| 3,140,880 | 7/1964 | Masser . |
| 4,262,929 | 4/1981 | Pierce . |
| 4,802,690 | 2/1989 | Raidel . |
| 5,230,528 | 7/1993 | Van Raden et al. ............. 280/124.116 |

FOREIGN PATENT DOCUMENTS

| | | |
|---|---|---|
| 2 698 825 | 6/1994 | France . |
| 928 813 | 6/1955 | Germany . |
| 15 55 601 | 8/1970 | Germany . |
| 24 15 708 | 10/1975 | Germany . |
| 25 23 916 | 12/1976 | Germany . |
| 43 38 651 | 3/1995 | Germany . |
| 194 21 874 | 12/1996 | Germany . |
| 195 21 875 | 12/1996 | Germany . |
| WO 94 04381 | 3/1994 | WIPO . |

*Primary Examiner*—Kenneth R. Rice
*Attorney, Agent, or Firm*—Rader, Fishman, Grauer & McGarry

[57] ABSTRACT

A suspension system for a vehicle includes a longitudinally extending frame, an axle connected to the frame for relative movement with respect thereto, an air spring mounted between the frame and the axle to yieldably support the axle with respect to the frame, and upper and lower trailing arms attached to each side of the frame. A first torsion bar extends between and is rigidly attached to the upper trailing arms and a second torsion bar extends between and is rigidly attached to the lower trailing arms. The torsion bar cooperates with the springs during deflection of the suspension system with respect to the frame to thereby yieldably resist relative movement between the trailing arms and the frame. In one embodiment, the upper and lower trailing arms are parallel to each other. This arrangement results in load equalization between the suspension assemblies. Any relative torque caused by deflection of the trailing arms is equally distributed between both torque bars. In another embodiment, the upper and lower trailing arms are non-parallel, and arranged such that when the trailing arms pivot due to road conditions or vehicle loading, fore and aft movement of the air spring and axle due to arcuate swing of the trailing arms is minimized.

16 Claims, 2 Drawing Sheets

DUAL TRAILING ARM VEHICLE SUSPENSION

RELATED APPLICATIONS

This application claims the benefit of U.S. Provisional Application No. 60/018,658 filed on May 30, 1996.

BACKGROUND OF THE INVENTION

1. Field of the Invention

This invention relates to suspension systems for vehicles. In one of its aspects, the invention relates to trailing arm suspensions for mounting an axle to a vehicle frame wherein each trailing arm comprises a pair of arms pivotably mounted to a frame bracket at one end and pivotably mounted to an axle plate at another end.

2. State of the Prior Art

Air spring suspensions are currently used to suspend the axles of trailers or other commercial vehicles. A typical air suspension assembly includes a trailing arm pivotally mounted at one end to a vehicle frame through a frame bracket. An air spring is mounted between the frame and the other end of the trailing arm. An axle is usually mounted to the trailing arm in proximity to the air spring. Two suspension assemblies are typically associated with each axle.

A problem associated with prior art air spring suspensions occurs when the axle and an associated trailing arm are deflected due to loading or irregularities in the road surface as the vehicle travels. When deflected, one end of the trailing arm rotates about a pivot point on the frame bracket, which causes the distal end of the trailing arm to swing in an arc. Since the air spring and axle are typically mounted at the distal end, they also undergo arcuate movement. The arcuate movement of the lower part of the spring results in a fore and aft movement and angular rotation of the air spring lower portion. Consequently, typical air springs are designed with a height to compensate for both axle deflection, fore and aft, and rotational movement. The increased air spring height necessitates an increase in material and bladder length, which results in greater manufacturing expense.

SUMMARY OF THE INVENTION

According to the invention, a suspension system for a vehicle which has a longitudinally extending frame with a pair of opposite sides, has a pair of frame brackets laterally spaced from each other and each of which is adapted to be mounted to a side of the frame. A first pair of longitudinally extending upper trailing arms has first ends pivotally connected to the frame brackets and second ends. A second pair of longitudinally extending lower trailing arms has first ends pivotally connected to the frame brackets and second ends. The upper trailing arms are vertically spaced above the lower trailing arms. An axle is mounted to and extending between the ends of each set of first and second trailing arms, the axle having opposite ends and a central axis. A pair of springs are mounted to the second ends of the first and second trailing arms and adapted to be mounted to the frame to cushion the movement of the first and second trailing arms toward the frame. In one embodiment, a first torsion bar extends between and is rigidly attached to the upper trailing arms. In a further embodiment, a second torsion bar extends between and is rigidly attached to the lower trailing arms. The torsion bars yieldably resist relative movement between the trailing arms and the frame.

In a further embodiment, the upper and lower trailing arms are parallel to each other. This arrangement results in load equalization between the suspension assemblies. Any relative torque caused by deflection of the trailing arms is equally distributed between both torque bars. Due to the parallel arrangement of the arms, the axle does not rotate or experience torsion about its central axis when at least one of the upper and lower trailing arm sets rotates from a rest position to a deflected position.

In an even further embodiment, the upper and lower trailing arms are non-parallel, and arranged such that when the trailing arms pivot due to road conditions or vehicle loading, fore and aft movement of the air springs due to arcuate swing of the trailing arms is minimized. In this arrangement, the axle functions as a torque rod and cooperates with the torsion bars, when provided, to equalize forces generated in the suspension system at both sides of the frame. Alternatively, or in addition to the torsion bars, the non-parallel suspension assembly can include a track bar or other stabilizing components. Further, rotation of the air spring piston is also greatly reduced. With the fore and aft movement and rotation greatly reduced, the air springs can be smaller in height and have a reduced weight and cost while maintaining the load bearing performance of larger springs.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
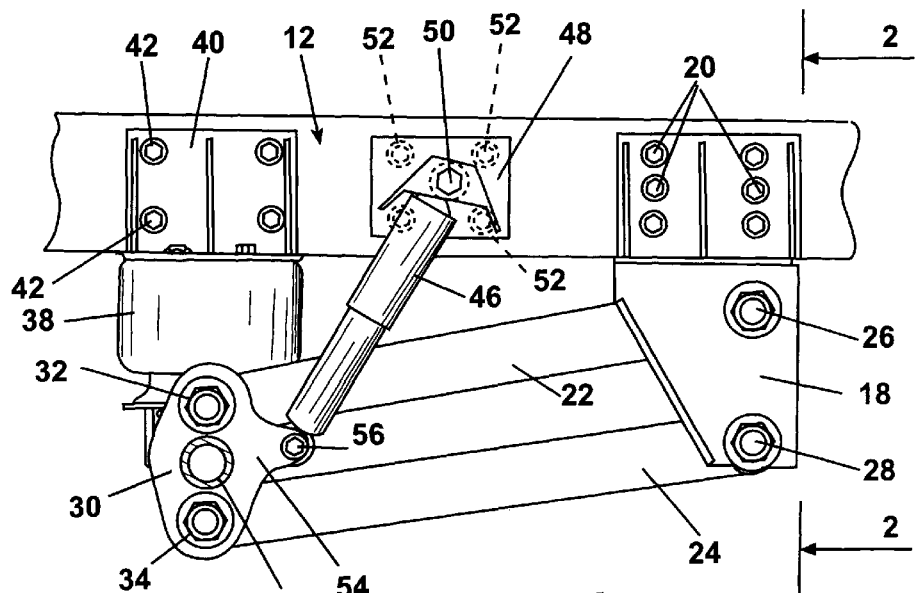
FIG. 1 is a side elevational view of a portion of a vehicle frame and a suspension assembly according to the invention.
Figure 2:
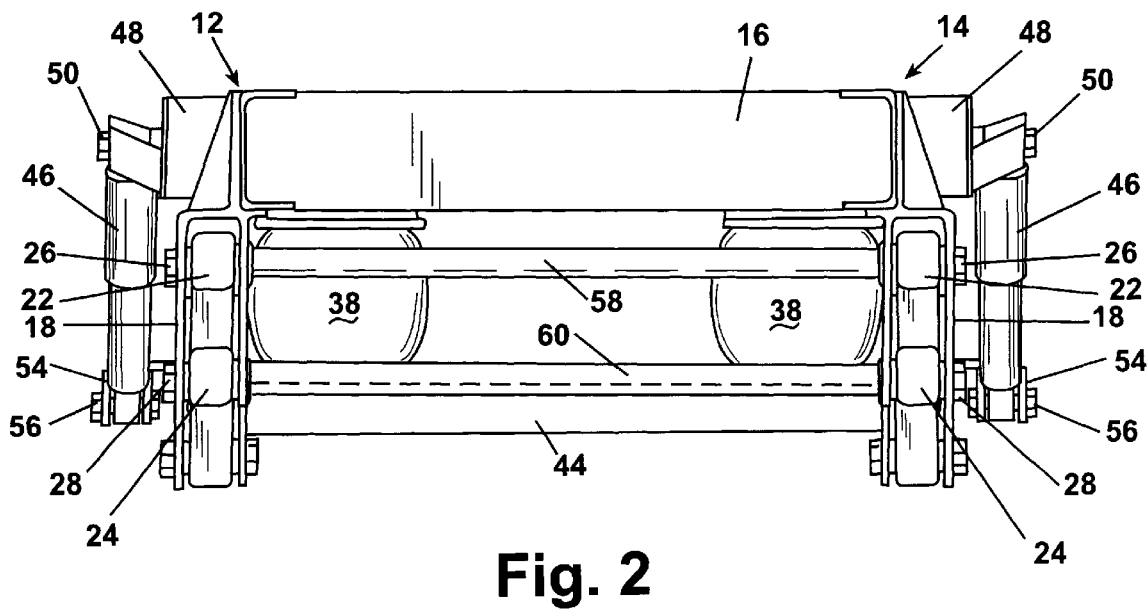
FIG. 2 is a front elevational view of the vehicle frame and suspension assembly taken along line 2—2 of FIG. 1.
Figure 3:
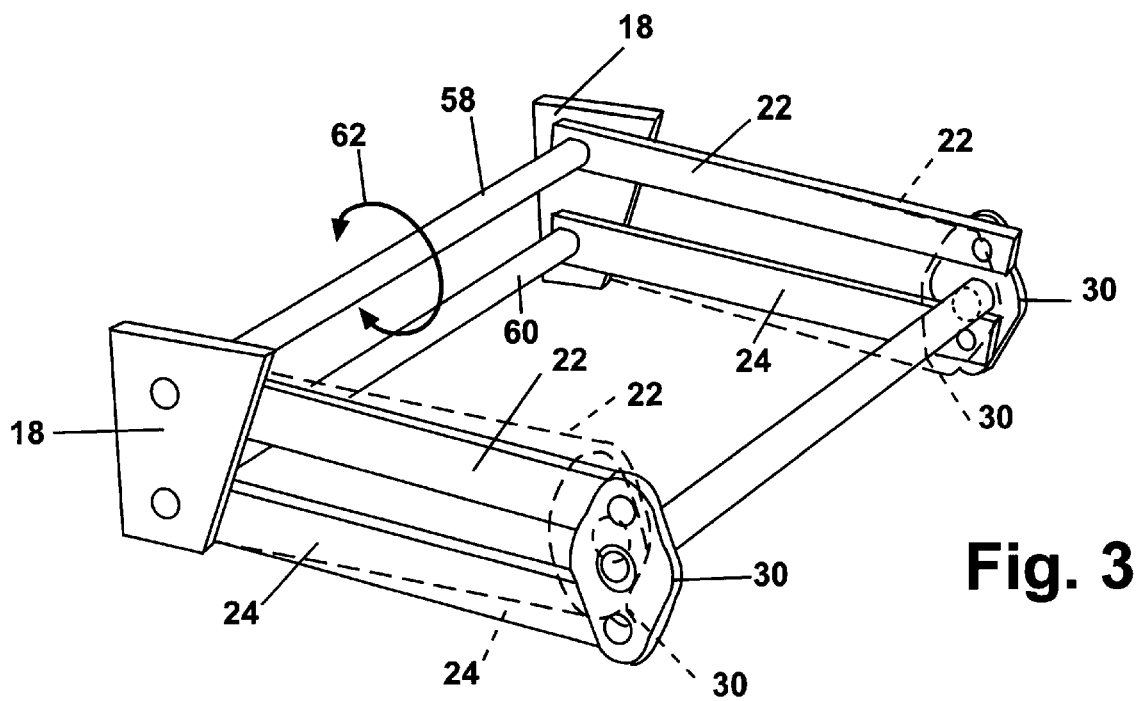
FIG. 3 is a perspective schematic view of a subassembly of the suspension assembly illustrated in FIGS. 1 and 2.

Referring now to the drawings and to FIGS. 1 through 3 in particular, there is shown a vehicle frame comprising side frame beams 12 and 14 and a cross-brace 16 joined therebetween. The front of the vehicle is to the right as viewed in FIG. 1. For the sake of simplicity, only one side of the suspension assembly will be described in detail although it is understood that each side of the vehicle has an identical portion of the assembly.

Each side of the suspension assembly comprises a hanger bracket 18 secured to the frame beam 12 through bolts 20 or welding. Upper and lower trailing arms 22 and 24 are pivotably mounted to the hanger bracket 18 through bushed joints 26 and 28, respectively. The other ends of the trailing arms 22 and 24 are secured through bushed joints 32 and 34, respectively, to axle bracket 30. Bushed joints of the type used in bushed joints 26, 28, 32 and 34 are disclosed in U.S. Pat. No. 3,140,880, for example. An air spring 38 is mounted at an upper end to the beam 12 through a frame bracket 40 and bolts 42 or welded. The air spring 38 is mounted to the axle bracket 30 at a lower end thereof through a suitable bracket and bolts (not shown). An axle 44 is secured to a central portion of the axle bracket 30.

An upper end of a shock absorber 46 is pivotably mounted to a bracket 48 through a bolt 50. The bracket 48 in turn is mounted to the beam 12 through bolts 52. The lower end of the shock absorber 46 is pivotably mounted to the axle bracket 30 through extension 54 and bolt 56.

As shown in FIGS. 2 and 3, an upper torsion bar 58 extends between upper trailing arms 22 located on opposite sides of the vehicle frame. Upper torsion bar 58 is rigidly attached to the upper trailing arms 22 for rotational movement therewith. Likewise, a lower torsion bar 60 extends between the lower trailing arms 24 and is rigidly attached thereto for rotational movement therewith. Due to the parallelogram arrangement of the upper and lower trailing arms 22, 24, axle bracket 30 and hanger bracket 18, any deflection of the axle bracket 30 will cause vertical deflection of the air spring 38, as well as a front to back or longitudinal deflection. The amount of longitudinal deflection can be controlled by the length of upper and lower trailing arms 22, 24 and their angular position relative to the ground. The more level they are, the less longitudinal motion will be realized. Thus, with a longer length trailing arm, longitudinal deflection of the air spring 38 can be reduced to a minimum. Rotation of the air spring piston is therefore very nearly zero.

With the dual torque bar arrangement according to the invention, vehicle sway is resisted. When one end of the axle tilts upwardly and the other end tilts downwardly, as shown in dashed line in FIG. 3, such as during a right turn, the first trailing arms 22 and 24 attempt to twist the torsion bars 58 and 60 in the counter-clockwise direction as viewed in FIG. 3 and the second trailing arms 22 and 24 resist by exerting a torsion on the bars in a clockwise direction. These movements are resisted by the torsion bars 58, 60. Hence, the torsion bars will exert a vehicle stabilizing influence in the sense that the vehicle frame will be yieldingly maintained in parallel relation to the axle. This same action and reaction occurs as well when irregularities in the road surface or unequal vehicle loading are encountered.

When the parallel trailing arms pivot up and down, the trailing arms pivot about an arc and thus the lower ends of the air spring shift slightly fore and aft, without rotating, with respect to the vehicle frame. However, the axle ends maintain their rotational orientation due to any fore or aft movement.

Figure 4:
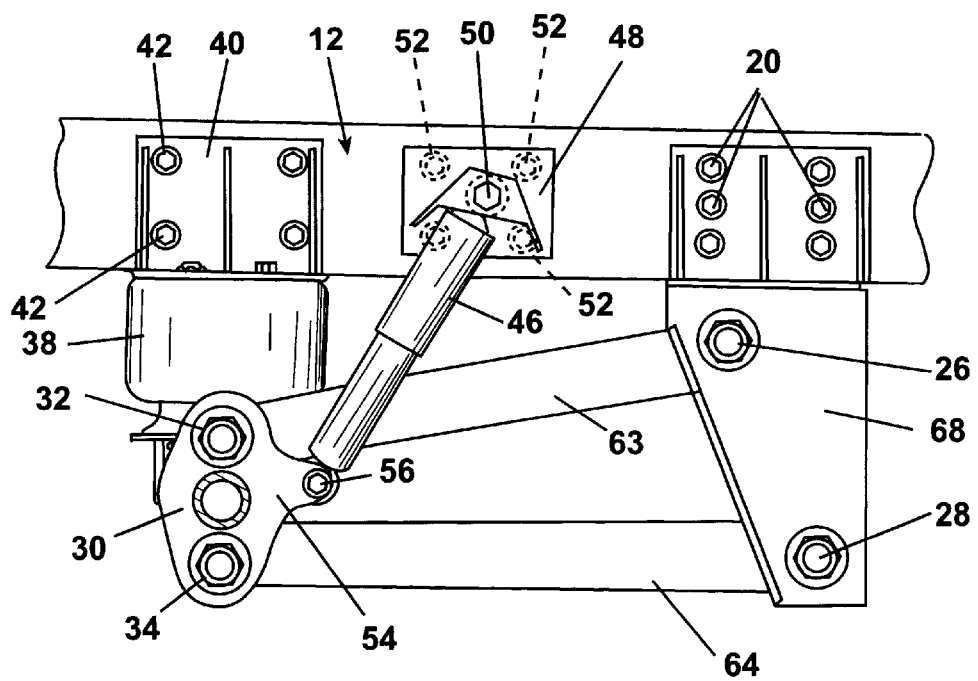
FIG. 4 is a side elevational view like FIG. 1 of a portion of a vehicle frame and a suspension system according to a second embodiment of the invention.

Turning now to FIG. 4, and according to a preferred embodiment of the invention, a suspension assembly having a non-parallel trailing arm arrangement is shown. Like parts in this drawing are represented by like numbers of parts shown in FIGS. 1–3. As in FIG. 1, the front of the vehicle is to the right. The trailing arm arrangement comprises an elongated hanger bracket 68 secured to opposite sides of the frame beam 12 through bolts 20 or by welding (only one side of the frame is shown for simplicity). The upper and lower trailing arms 63 and 64 are pivotably mounted to the hanger bracket 68 through bushed joints 26 and 28, respectively. The other ends of the trailing arms 63 and 64 are secured through bushed joints 32 and 34, respectively, to axle bracket 30. As in the previous embodiment, an air spring 38 is mounted to the beam 12 through a bracket 40 and bolts 42 or by welding. A lower end of the air spring is mounted to the axle bracket 30. An axle 44 is secured to a mid portion of the axle bracket 30.

A shock absorber 46 is pivotably mounted at an upper end to a bracket 48 through a bolt 50. The bracket 48 in turn is mounted to the beam 12 through bolts 52. The lower end of the shock absorber 46 is pivotably mounted to the axle bracket 30 through extension 54 and bolt 56.

The upper and lower trailing arms 63 and 64 converge with respect to each other between the frame bracket 68 and the axle bracket 30. The trailing arms 63, 64 have a length and are positioned at a converging angle such that when the axle 44 is deflected at one end relative to the other end due to road irregularities or different loading conditions encountered by the vehicle, the axle 44 moves in an essentially vertical direction with respect to the side frame 12. At the same time, however, one end of the axle will tend to twist with respect to the other end, thereby introducing a torsional stress in the axle 44. The bushed joint 28 can be positioned horizontally at the same level or below bushed joint 34. When the axle deflects upwardly, the lower trailing arm 64 will tend to rotate the bracket 30 in a counter-clockwise direction as viewed in FIG. 4. Likewise, the bushed joint 26 is positioned higher than the bushed joint 32 such that when the axle deflects upwardly, the upper trailing arm 63 will tend to rotate the bracket 30 in the counter-clockwise direction. When the axle is deflected downwardly, the trailing arms tend to rotate the axle bracket 30 in the clockwise direction. Due to the converging motion of the trailing arms 63, 64, the axle bracket 30 will tend to move in a linear, vertical direction to move the air spring in a vertical direction. This linear movement will tend to rotate one end of the axle 44 about its longitudinal axis with respect to the other end as the axle plate 30 moves linearly to the extent that the other end of the axle is not subject to the same forces of deflection. Consequently, one end of the axle will twist slightly with respect to the other end during deflection of the air spring. The axle, therefore, is made to function as a torque arm between the suspension assemblies located on each side of the vehicle. Air springs with shorter dimensions can be used since the air springs are not subject to large rotational or fore and aft movements. As in the previous embodiment, a torsion bar is preferably rigidly attached to each pair of trailing arms on each side of the suspension. Alternatively, the non-parallel suspension assembly can include a track bar or other stabilizing components as, for example, disclosed in U.S. Pat. No. 4,262,929.

Although the bushed joint 26 has been described as being higher that bushed joint 32, and bushed joint 28 has been described as being level with or below bushed joint 34, the bushed joints can be arranged such that the upper and lower trailing arms will rotate the axle in a clockwise direction when the axle is deflected upward. In any event, the upper and lower trailing arms must be non-parallel.

Reasonable variation and modification are possible within the spirit of the foregoing specification and drawings without departing from scope of the invention.

The embodiments of the invention in which an exclusive property or privilege is claimed are defined as follows:

1. In a suspension system for a vehicle having a frame with a pair of opposite sides, the suspension system including a pair of frame brackets laterally spaced from each other and each of which is adapted to be mounted to a side of the frame; a first pair of longitudinally extending upper trailing arms having first ends pivotally connected to the frame brackets and second ends; a second pair of longitudinally extending lower trailing arms having first ends pivotally connected to the frame brackets and second ends, the upper trailing arms being vertically spaced above the lower trailing arms; an axle pivotally mounted to and extending between the second ends of each set of first and second trailing arms, the axle having opposite ends and a central axis, a pair of springs mounted to the second ends of the first and second trailing arms and adapted to be mounted to the vehicle frame to cushion the movement of the first and second trailing arms toward the vehicle frame;

a first torsion bar extending between and being rigidly attached to one of the pairs of upper and lower trailing arms, the torsion bar being adapted to yieldably resist relative rotational movement between the one pair of trailing arms and the frame; the improvement which comprises:

the second ends of the first trailing arms are mounted to the axle vertically above the axle and the second ends of the second trailing arms are mounted to the axle vertically below the axle, and the pivotal mounting of the second ends of the first and second trailing arms to the axle and the central axis of the axle are aligned.

2. A suspension system according to claim 1 and further comprising a second torsion bar extending between and being rigidly attached to the other of the pairs of upper and lower trailing arms, the second torsion bar being adapted to yieldably resist relative movement between the other pair of trailing arms and the frame.

3. A suspension system according to claim 2 wherein the upper trailing arms are parallel with the lower trailing arms.

4. A suspension system according to claim 3 and further comprising a pair of axle support plates attached to the ends of the axle, and further wherein the second ends of the upper and lower trailing arms on each opposite side of the frame are pivotally mounted to one of the axle support plates.

5. A suspension system according to claim 4 wherein the upper and lower trailing arms are of the same length.

6. A suspension system according to claim 5 wherein the first and second ends of the upper trailing arms are vertically aligned with the first and second ends, respectively, of the lower trailing arms, such that the axle maintains the same angular orientation about its central axis during rotational movement of the trailing arms with respect to the respective frame brackets to which they are connected.

7. A suspension system according to claim 1 wherein the longitudinal extension of the upper trailing arm is non-parallel to the longitudinal extension of the lower trailing arm.

8. A suspension system according to claim 7 and further comprising a pair of axle support plates attached to the ends of the axle, and further wherein the second ends of the upper and lower trailing arms on each opposite side of the frame are pivotally mounted to one of the axle support plates.

9. A suspension system according to claim 9 wherein one of the upper and lower trailing arms is longer than the other of the upper and lower trailing arms whereby the axle rotates about its central axis during movement of at least one set of upper and lower trailing arms with respect to the respective frame brackets to which they are connected.

10. A suspension system according to claim 1 wherein the spring is an air spring.

11. In a suspension system for a vehicle having a frame with a pair of opposite sides, the suspension system including a pair of frame brackets laterally spaced from each other and each of which is adapted to be mounted to a side of the frame; a first pair of longitudinally extending upper trailing arms having first ends pivotally connected to the frame brackets and second ends; a second pair of longitudinally extending lower trailing arms having first ends pivotally connected to the frame brackets and second ends, the upper trailing arms being vertically spaced above the lower trailing arms; an axle pivotally mounted to and extending between the second ends of each set of first and second trailing arms, the axle having opposite ends and a central axis, a pair of springs mounted to the second ends of the first and second trailing arms and adapted to be mounted to the vehicle frame to cushion the movement of the first and second trailing arms toward the vehicle frame, a first torsion bar extending between and being rigidly attached to one of the pairs of upper and lower trailing arms, the torsion bar being adapted to yieldably resist relative rotational movement between the one pair of trailing arms; and the improvement comprising:

the upper trailing arms are in a common plane with the lower trailing arms.

12. A suspension system according to claim 11 wherein one of the upper and lower trailing arms is longer than the other of the upper and lower trailing arms whereby the axle rotates about its central axis in torsion during rotational movement of at least one set of upper and lower trailing arms with respect to the respective frame brackets to which they are connected.

13. A suspension system according to claim 12 and further comprising a pair of axle support plates mounted to the ends of the axle, and further wherein the second ends of the upper and lower trailing arms on each side of the frame are pivotally mounted to one of the axle support plates.

14. A suspension system according to claim 12 and further comprising a second torsion bar extending between and being rigidly attached to the other of the pairs of upper and lower trailing arms to yieldably resist relative rotation between the other of the pairs of trailing arms and the frame.

15. A suspension system according to claim 11 and further comprising a second torsion bar extending between and being rigidly attached to the other of the pairs of upper and lower trailing arms to yieldably resist relative movement between the other of the other pair of trailing arms and the frame.

16. A suspension system according to claim 11 wherein the longitudinal extension of the upper trailing arm is non-parallel to the longitudinal extension of the lower trailing arm and so configured so that the axle rotates about its central axis during rotational movement of the trailing arms with respect to the respective frame brackets to which they are connected.

* * * * *

UNITED STATES PATENT AND TRADEMARK OFFICE
CERTIFICATE OF CORRECTION

PATENT NO.: 5,924,712

DATED: July 20, 1999

INVENTOR(S): William C. Pierce

It is certified that error appears in the above-identified patent and that said Letters Patent is hereby corrected as shown below:

Claim 9, col. 5, line 39, "9" should be --8--.

Signed and Sealed this

First Day of February, 2000

*Attest:*

Q. TODD DICKINSON

*Attesting Officer*   *Acting Commissioner of Patents and Trademarks*